United States Patent [19]
Chen

[11] Patent Number: 5,771,792
[45] Date of Patent: Jun. 30, 1998

[54] FRUIT CLEANING DEVICE

[76] Inventor: Tsung-Ming Chen, 2F, No. 9, Alley 5, Lane 21, Wen Hwu St., Nei Hwu Dist., Taipei, Taiwan

[21] Appl. No.: 902,267

[22] Filed: Jul. 29, 1997

[51] Int. Cl.$^6$ .......................... A47J 43/04; B01D 33/00; B01D 29/85; B08B 3/02

[52] U.S. Cl. .............................. 99/536; 99/495; 99/510; 99/584; 134/115 R; 134/198; 210/464; 210/474

[58] Field of Search .............................. 99/516, 534, 536, 99/495, 510, 584; 210/464, 474, 477, 380.1; 4/656, 654, 638; 134/137, 118, 198, 115 R, 149, 157, 162; 47/67; 68/213, 148; D7/667

[56] References Cited

U.S. PATENT DOCUMENTS

| | | | |
|---|---|---|---|
| 62,082 | 2/1867 | Smith | 4/656 |
| 1,245,768 | 11/1917 | Randall | 124/198 X |
| 2,535,967 | 12/1950 | Thiermann | 4/656 |
| 4,075,105 | 2/1978 | Steiner et al. | 210/477 |
| 4,184,775 | 1/1980 | Akizawa | 99/485 X |
| 4,220,534 | 9/1980 | Perry | 210/475 X |
| 4,550,656 | 11/1985 | Kirk | 99/536 X |
| 4,626,352 | 12/1986 | Massey et al. | 210/469 |
| 4,944,051 | 7/1990 | Porter | 4/638 |
| 5,064,535 | 11/1991 | Hsu | 99/495 X |
| 5,184,544 | 2/1993 | Ling | 99/536 |
| 5,505,850 | 4/1996 | Licari | 210/464 |
| 5,671,664 | 9/1997 | Jacobson | 99/536 |

*Primary Examiner*—Timothy F. Simone
*Attorney, Agent, or Firm*—Rosenberg, Klein & Bilker

[57] ABSTRACT

A fruit cleaning device includes a lid and a bowl. The lid comprises a barrel shaped handle with a plurality of small apertures formed on the lid within the handle. The bowl comprises a plurality of blades extending along the inner wall thereof and a plurality of scrapers along the bottom surface bulging upwardly therefrom. Upon the lid and the bowl are closed, an enclosure is formed which is able to receive fruits and water therein. By shaking the device, the fruit will roll on the blades and scrapers that will scratch off any foreign objects attached on the fruits. The water is later drained from the small apertures, and fruit are cleaned thoroughly.

5 Claims, 6 Drawing Sheets

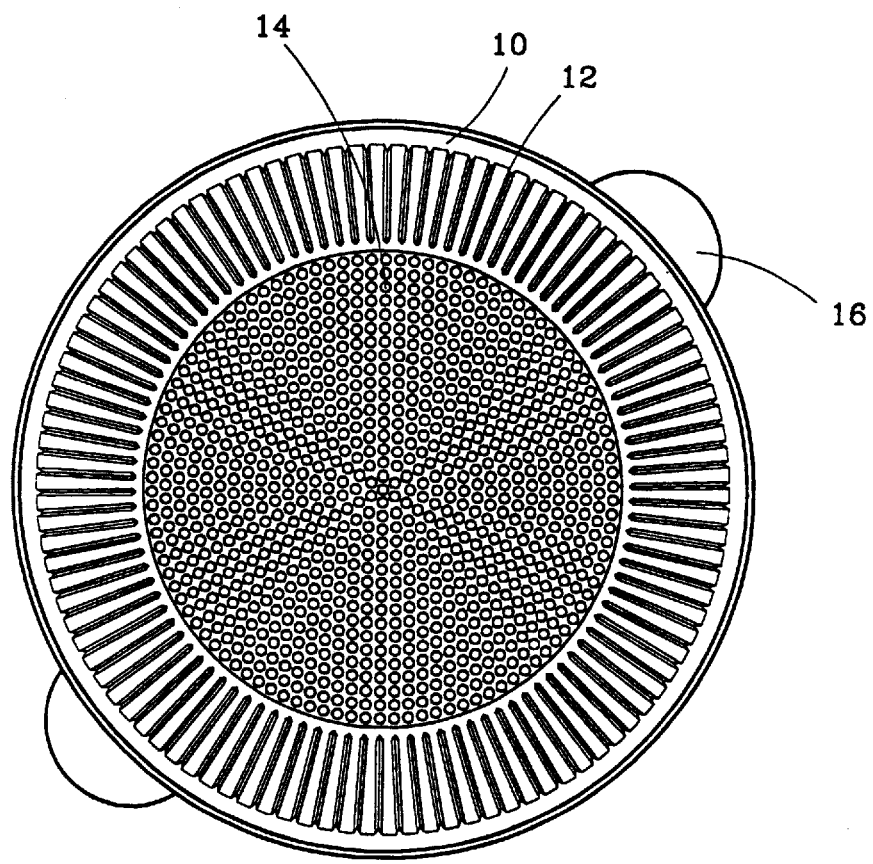
F I G. 2

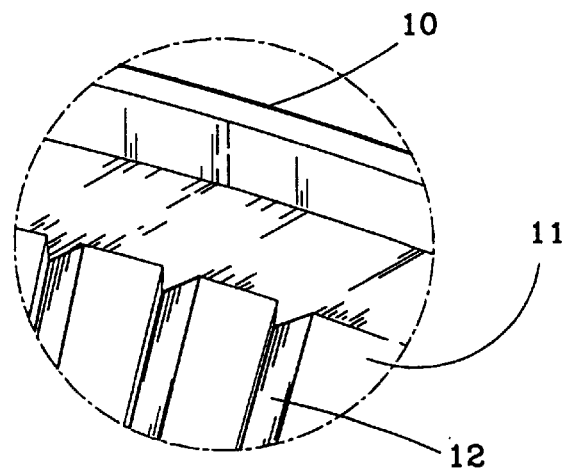
F I G. 3
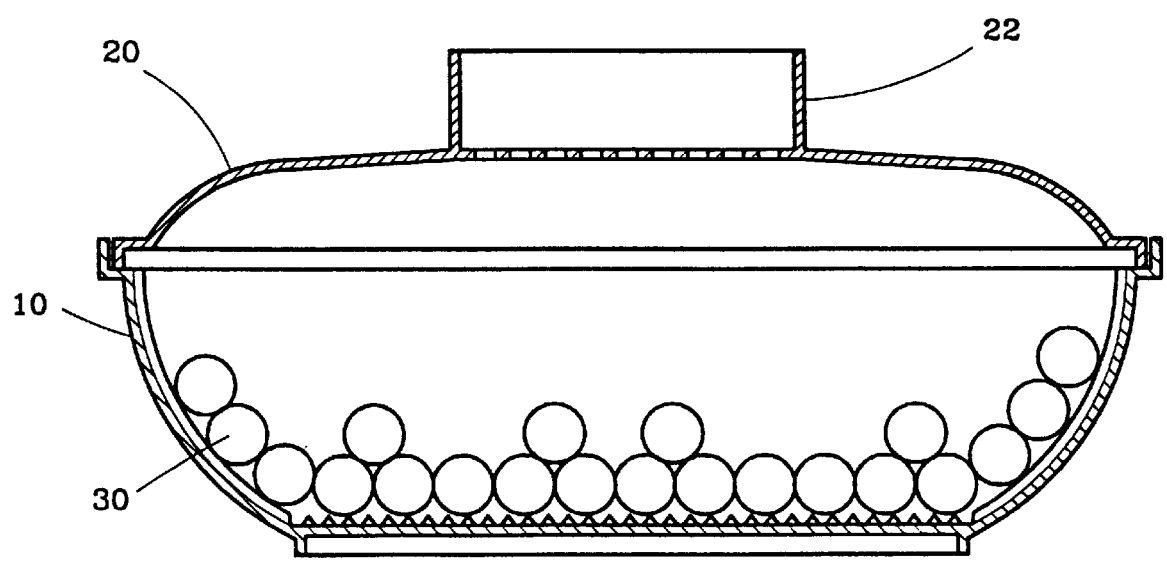
F I G. 5

FRUIT CLEANING DEVICE

BACKGROUND OF THE INVENTION

1. Field of the Invention

This invention relates to a fruit cleaning device, and more particular to a device which is to clean fruit with small size.

2. Description of Prior Art

The scientists have found that vegetables and fruit are healthy food to human beings. Fruit are even healthier because of containing high Vitamins which is good to maintain a healthy body. However, since most of the fruit are either laid on the ground or exposed on the tree trunk during the growing which may be attached with dirty objects and require to be washed thoroughly.

Many consumers believe that peering off the skin of fruit is good enough in stead of washing in advance. But they have not pay any attention of their hands have touched the skin that will carry germs to the fruit and get sick.

In view of this, the present inventor has derived a fruit cleaner which is able to clean fruit without the requirement of using cleanser.

BRIEF DESCRIPTION OF THE DRAWINGS

FIG. 2 is a top view of the bowel of the present invention;

FIG. 3 is an enlarged view of circular B of FIG. 1;

FIG. 5 is a side cross-section view partially sectioned showing grapes are maintained in the cleaner of the present invention.

DETAILED DESCRIPTION OF THE PREFERRED EMBODIMENT

Figure 1:
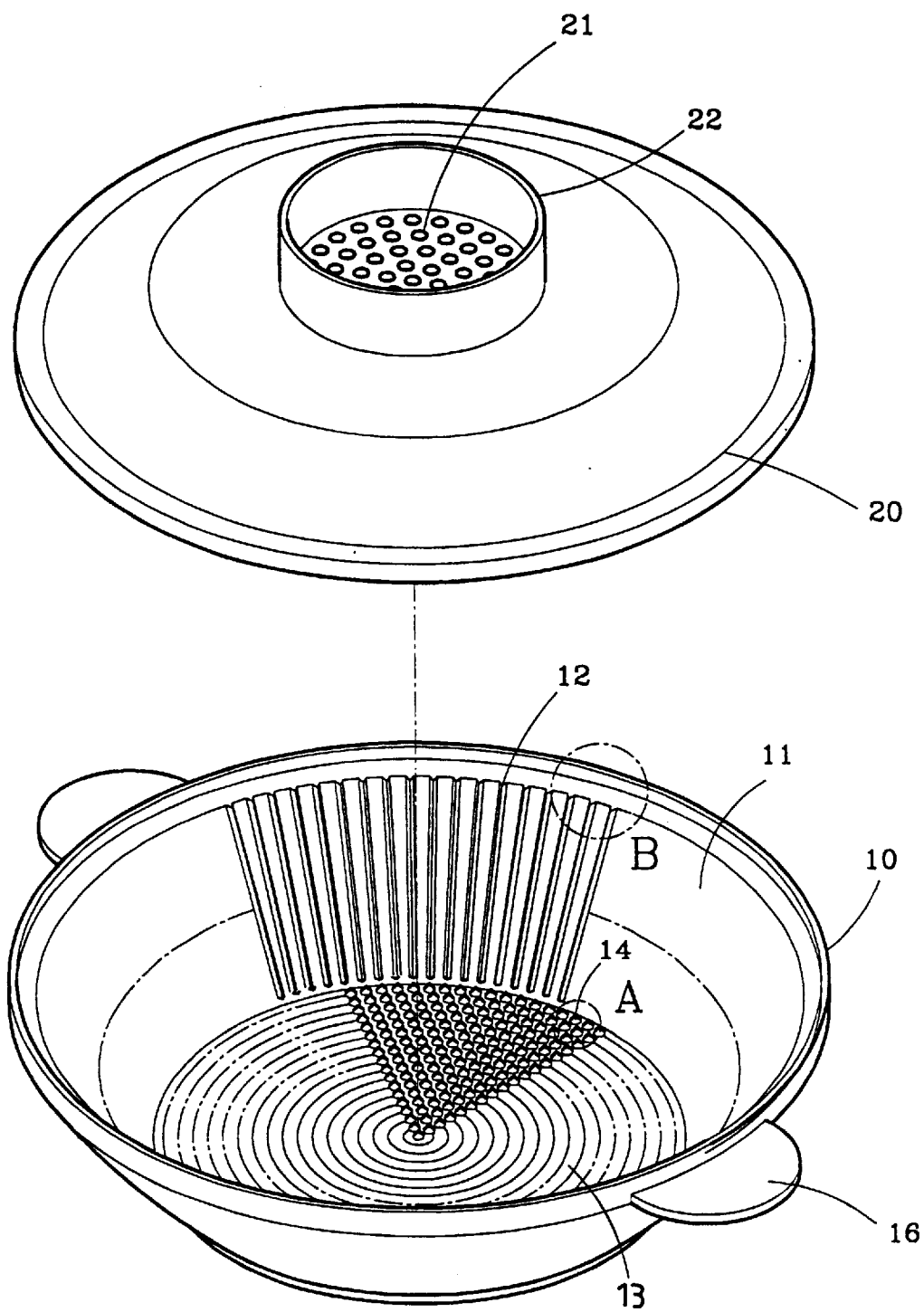
FIG. 1 is an exploded view of the present invention.

A fruit cleaning device of the present invention comprises a bowl 10, and a lid 20.

The bowl 10 has a plural blades 12 formed along the inner wall 11 vertically, and scrapers 14 in corn shape, bulging upward along the inner bottom surface 13. Both of the blades 12 and the scrapers 14 are formed with blunt edges in order not to damage the skin of grapes when cleaning. A pair of lugs 16 are formed on the edge of respective sides for the convenient of handhold.

The lid 20 includes a plurality of small apertures 21 formed in a barrel shaped handle 22 at the center portion to facilitate holding the device while the apertures 21 are adapted to filter out water in the bowl 10.

Upon closing the lid 20 and the bowl 10, as shown in FIG. 5, a sealed enclosure is formed for receiving small fruit 30 and water therein. By shaking the device, the fruit 30 in the enclosure roll simultaneously. The fruit 30 will roll on the blades 12 and scrapers 14 that scratches out any foreign objects attached on the skin of fruit 30. Some more clean water is drained into the enclosure again and the device is turned upside down, such that water and foreign objects fallen from the skin of the fruit 30 are drained out from the apertures 21.

Figure 4A:
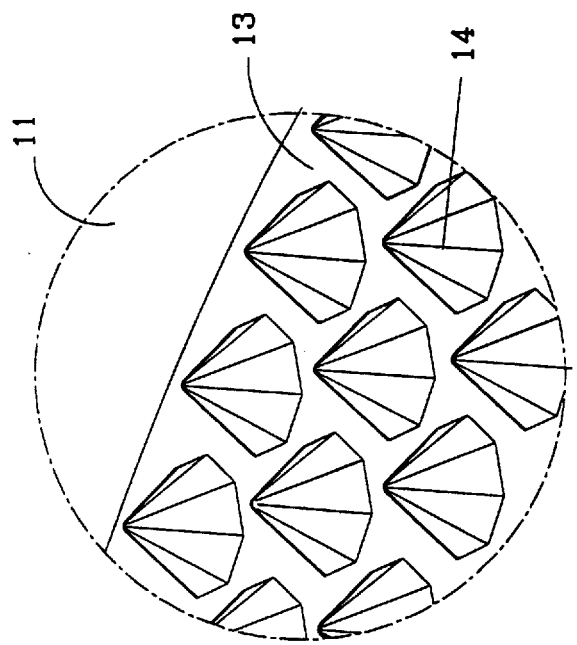
FIG. 4A is an enlarged view of a first embodiment of the scrapers of FIG. 1.
Figure 4:
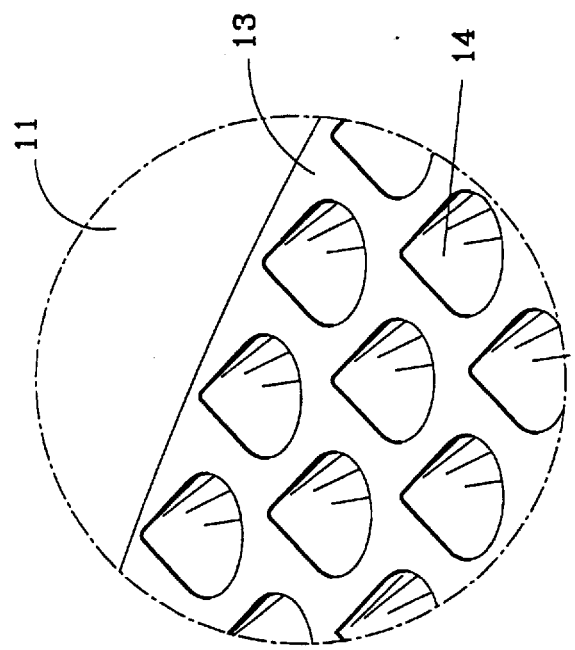
FIG. 4 is an enlarged view of circular A of FIG. 1.
Figure 4C:
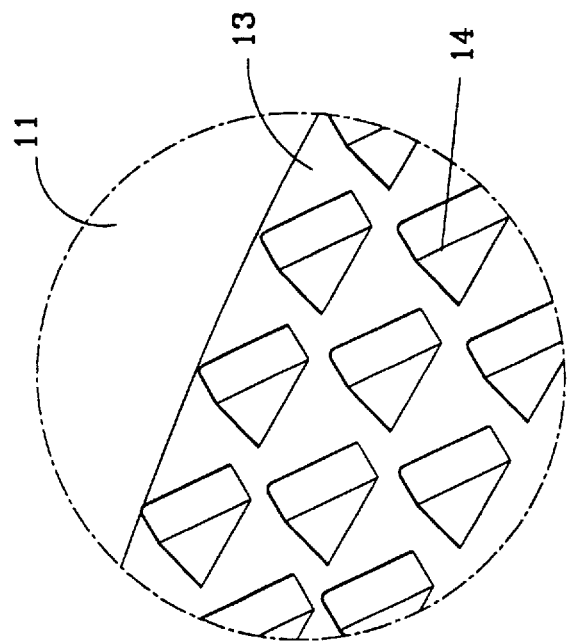
FIG. 4C is an enlarged view of a third embodiment of the scraper of FIG. 1.
Figure 4B:
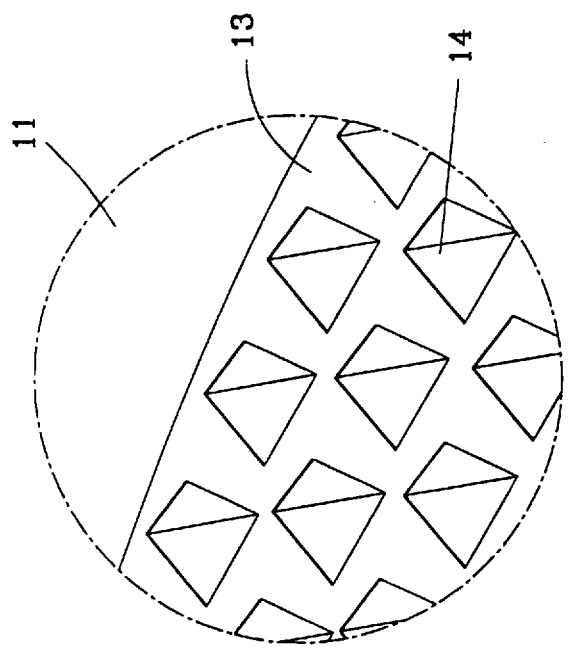
FIG. 4B is an enlarged view of a second embodiment of the scraper of FIG. 1.
Figure 6:
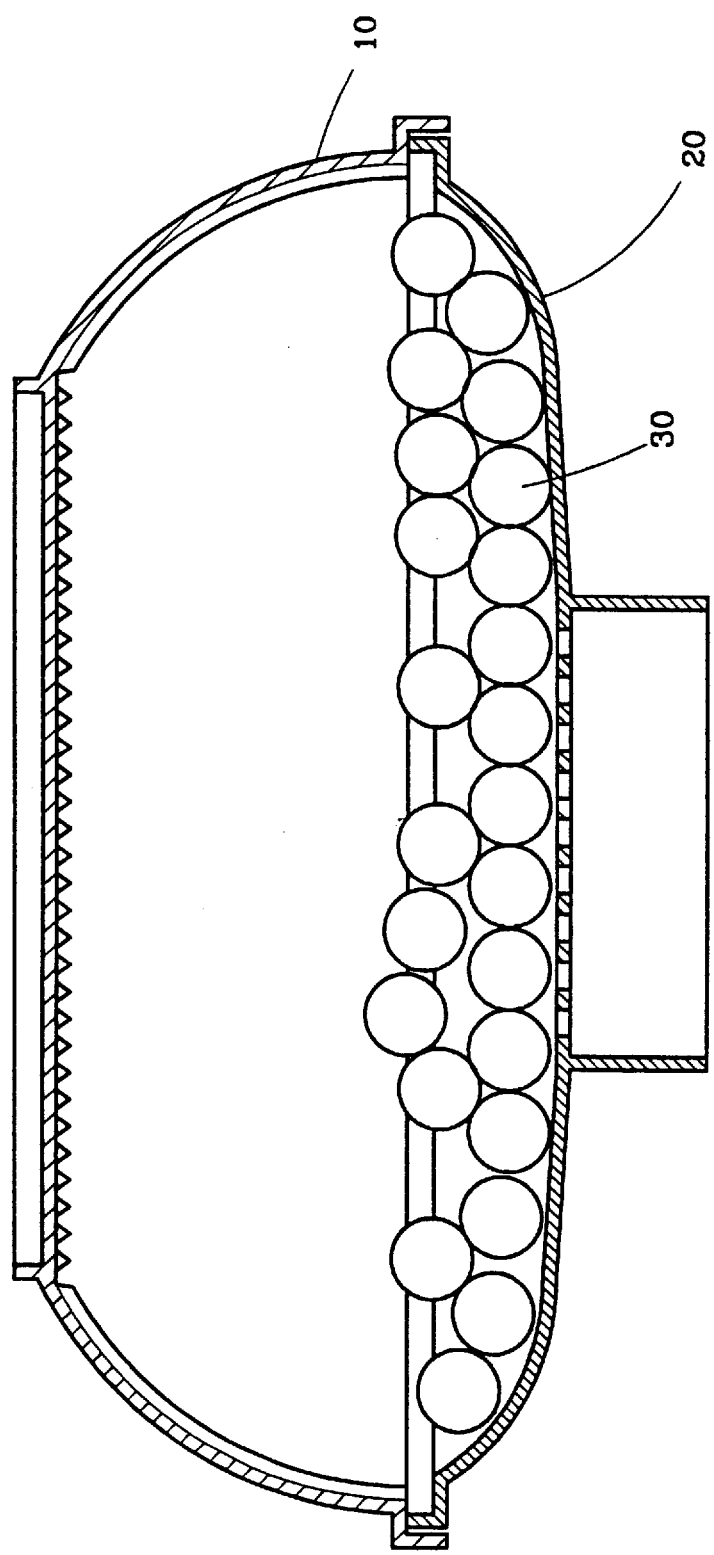
FIG. 6 is another side cross-section view of the cleaner in an upside-down as a filter.

The scrapers 14 are not limited in a fixed figures and may be formed in different shapes, such as in diamond shape, as shown in FIG. 4A, in pyramid shape, as shown in FIG. 4B and in triangle shape, as shown in FIG. 4C. Furthermore, the blades 12 and the scrapers 14 are exchangeable by each other, either in whole or in part.

I claim:

1. A fruit cleaning device comprising a lid and a bowl and the improvements comprising:

said bowl comprising a plural blades extending along the inner wall vertically and a plural scrapers bulging upward from the bottom inner surface;

said lid comprising a plurality of small apertures in a barrel shaped handle on the center portion thereof.

2. The device of claim 1, wherein a pair of lugs are formed on the edge of respective sides of said bowl.

3. The device of claim 1, wherein said scrapers are formed into various shapes which includes, but not limited, corn shape, diamond shape, pyramid shape and triangle shape.

4. The device of claim 1, wherein said blades can be replaced in whole or in part by said scrapers.

5. The device of claim 1, wherein said scrapers can be replaced in whole or in part by said blades.

* * * * *

UNITED STATES PATENT AND TRADEMARK OFFICE
CERTIFICATE OF CORRECTION

PATENT NO.  : 5,771,792
DATED       : 30 June 1998
INVENTOR(S) : TSUNG-MING CHEN It is certified that error appears in the above-identified patent and that said Letters Patent are hereby corrected as shown below:

On the title page: Item

[76], delete the words "Alley 5" and insert therefor the words --Alley 15--

Signed and Sealed this

Eighth Day of December, 1998

Attest:

BRUCE LEHMAN

Attesting Officer

Commissioner of Patents and Trademarks